(12) United States Patent
Erban

(10) Patent No.: US 11,975,832 B2
(45) Date of Patent: May 7, 2024

(54) FLOW BODY FOR AN AIRCRAFT HAVING A SOLID TRAILING-EDGE COMPONENT

(71) Applicant: Airbus Operations GmbH, Hamburg (DE)

(72) Inventor: Marcus Erban, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 0 days.

(21) Appl. No.: 17/425,266

(22) PCT Filed: May 25, 2020

(86) PCT No.: PCT/EP2020/064448
§ 371 (c)(1),
(2) Date: Jul. 22, 2021

(87) PCT Pub. No.: WO2020/239699
PCT Pub. Date: Dec. 3, 2020

(65) Prior Publication Data
US 2022/0119093 A1    Apr. 21, 2022

(30) Foreign Application Priority Data
May 27, 2019  (DE) .................. 102019114098.6

(51) Int. Cl.
*B64C 3/28*    (2006.01)
*B64C 9/24*    (2006.01)
*B64D 15/04*   (2006.01)

(52) U.S. Cl.
CPC .................. *B64C 3/28* (2013.01); *B64C 9/24* (2013.01); *B64D 15/04* (2013.01)

(58) Field of Classification Search
CPC .............. B64C 3/28; B64C 9/24; B64D 15/04
See application file for complete search history.

(56) References Cited

U.S. PATENT DOCUMENTS

| 2,473,728 | A | 6/1949 | Rutledge |
| 3,004,607 | A | 10/1961 | Linnabery et al. |

(Continued)

FOREIGN PATENT DOCUMENTS

| CA | 711625 A | 6/1965 |
| CN | 103466078 A | 12/2013 |

(Continued)

OTHER PUBLICATIONS

International Search Report; priority document.

(Continued)

*Primary Examiner* — Brady W Frazier
*Assistant Examiner* — Shanna Danielle Glover
(74) *Attorney, Agent, or Firm* — Greer, Burns & Crain, Ltd.

(57) ABSTRACT

A flow body for an aircraft, in particular for a wing leading edge device, is proposed, the flow body having a curved front skin having a leading edge and at least one trailing-edge component coupled with at least one spanwise edge of the front skin, wherein the trailing-edge component comprises a constant cross-sectional profile that tapers in a chordwise direction to form two spanwise flow surfaces that end in a trailing edge, and wherein the trailing-edge component is designed for providing a flush transition between the front skin and at least one of the two spanwise flow surfaces.

14 Claims, 2 Drawing Sheets

(56) References Cited

U.S. PATENT DOCUMENTS

| | | | |
|---|---|---|---|
| 4,657,615 A | | 4/1987 | Braun et al. |
| 4,752,049 A | | 6/1988 | Cole |
| 5,114,100 A | * | 5/1992 | Rudolph ................ B64D 15/04 244/130 |
| 6,551,428 B1 | | 4/2003 | Guillou et al. |
| 7,753,313 B1 | * | 7/2010 | Barr ......................... B64C 9/24 244/123.1 |
| 7,878,460 B2 | * | 2/2011 | Armstrong ............. B64D 15/12 244/214 |
| 2010/0193635 A1 | | 8/2010 | Barr et al. |
| 2013/0299061 A1 | | 11/2013 | Rodman |
| 2019/0233126 A1 | * | 8/2019 | Poloni ....................... B64C 3/28 |

FOREIGN PATENT DOCUMENTS

| | | | |
|---|---|---|---|
| GB | 625778 A | 7/1949 |
| GB | 644900 A | 10/1950 |
| WO | 2018005529 A1 | 1/2018 |

OTHER PUBLICATIONS

German Search Report; priority document.
European Examination Report for corresponding European Patent Application No. 20729028.9 dated Jun. 23, 2023; priority document.

* cited by examiner

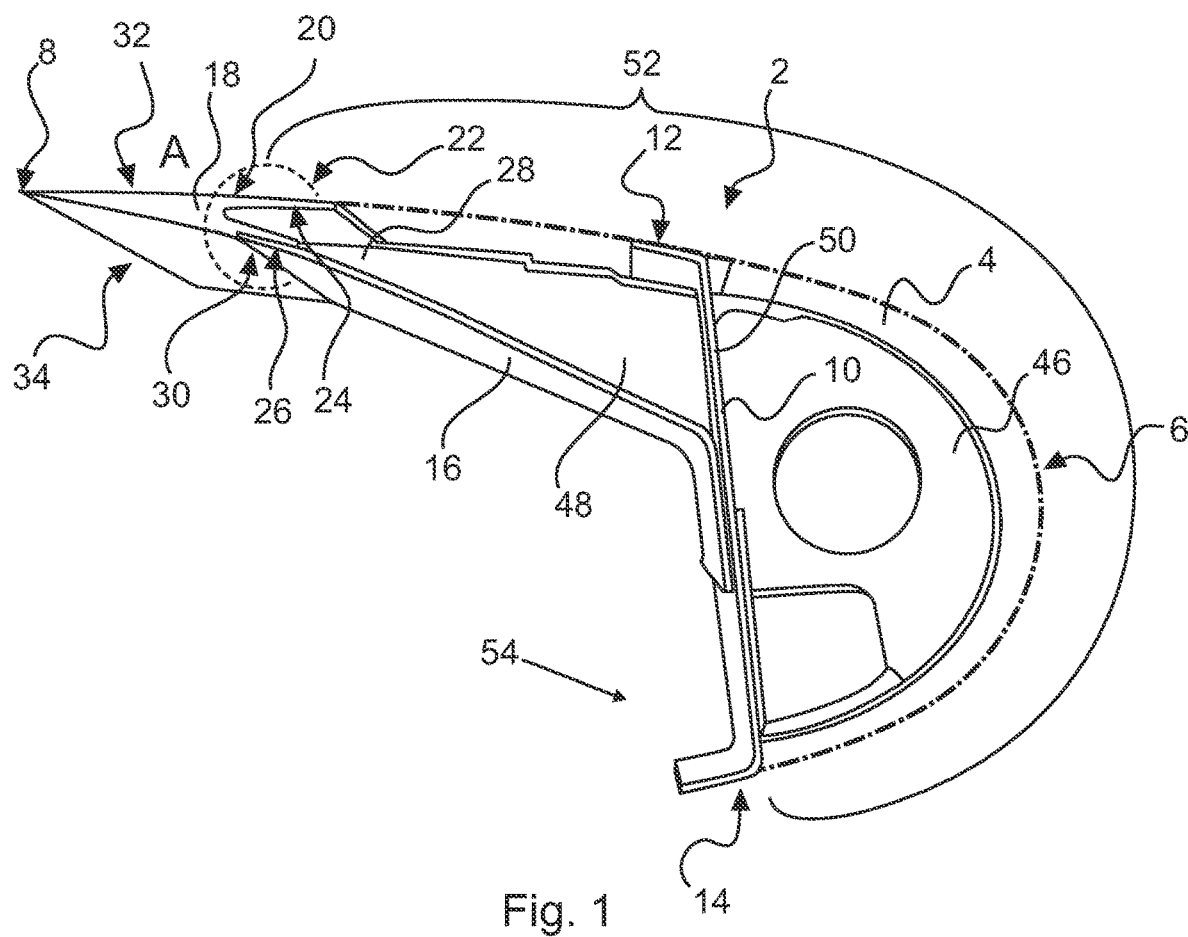
Fig. 1
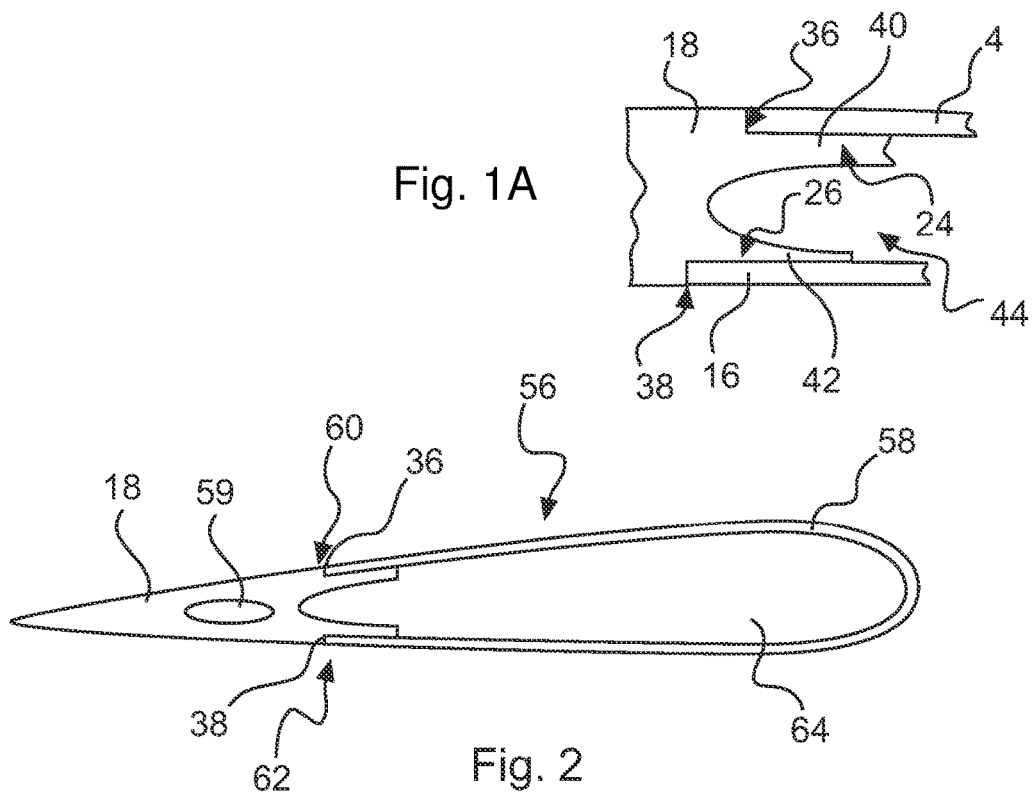
Fig. 1A
Fig. 2

FLOW BODY FOR AN AIRCRAFT HAVING A SOLID TRAILING-EDGE COMPONENT

CROSS-REFERENCES TO RELATED APPLICATIONS

This application claims the benefit of the International Application No. PCT/EP2020/064448, filed on May 25, 2020, and of the German patent application No. 10 2019 114 098.6 filed on May 27, 2019, the entire disclosures of which are incorporated herein by way of reference.

FIELD OF THE INVENTION

The invention relates to a flow body for an aircraft, in particular for a wing leading edge device, a wing having a fixed wing body and a wing leading-edge device having a flow body and an aircraft having such a wing or at least one such flow body.

BACKGROUND OF THE INVENTION

Commercial aircraft often comprise fixed and movable aerodynamic structures with an at least partially hollow structure. Depending on the size and shape of the structures, as well as their optional movability, different design and construction principles are applied. For example, various high lift systems are known, which are based on movable flow bodies for selectively increasing the lift coefficient of a wing. These may include trailing edge flaps, and leading-edge devices. During takeoff and landing, they are usually activated, i.e., moved from a retracted into an extended position.

Leading-edge slats or other flow bodies arranged on an aircraft and exposed to an air flow, often comprise a front skin with a desired aerodynamic shape and an internal stiffening structure having mechanical interfaces for coupling with a guiding device, a structure or an actuator. It is a common approach to use a separate trailing edge at the end of a flow body, which may be built from a metal honeycomb with top and bottom covers for the tip for achieving a desired mechanical stability and a low weight at the same time.

SUMMARY OF THE INVENTION

The use of a honeycomb part at the trailing edge of a flow body limits the available size for an effective area that is anti- or de-iced. Furthermore, the honeycomb/sandwich design leads to higher manufacturing costs.

Consequently, it is an object of the invention to propose a flow body for an aircraft having a trailing edge with a more cost-efficient design, satisfying mechanical properties and a considerably low weight at the same time.

A flow body for an aircraft, in particular for a wing leading edge device, is proposed, the flow body having a curved front skin having a leading edge and at least one trailing-edge component coupled with at least one spanwise edge of the front skin, wherein the trailing-edge component comprises a constant cross-sectional profile that tapers in a chordwise direction to form two spanwise flow surfaces that end in a trailing edge, and wherein the trailing-edge component is designed for providing a flush transition between the front skin and at least one of the two spanwise flow surfaces.

The flow body may be a wing leading edge device as a part of a high-lift system. It may exemplarily be a leading-edge flap or a leading-edge slat. However, the flow body may also include spoilers, flaps, ailerons, flaperons, fixed wings, horizontal and vertical tail planes and other kinds of flow bodies. Hence, the flow body may be a fixed flow body or a movable flow body attached to an aircraft. While some of the advantages or features are explained using a leading-edge device as an example, this does not rule out other kinds of flow bodies.

The flow body may be arranged along the spanwise direction, at least in a retracted state if it is a movable flow body, or it may extend along the spanwise direction per se, if it is a fixed flow body. In the case of a vertical tail plane, it extends along the vertical direction. Accordingly, the flow body may, in many cases, comprise an elongate shape that extends along the spanwise direction and comprises a certain profile contour. The profile contour is mainly determined by the desired aerodynamic characteristics. It is preferred that the flow body is sufficiently stiff to serve for the intended purpose, since it is directly exposed to a strong air flow during flight conditions.

The front skin is arranged on the front side of the flow body and comprises a leading edge of the flow body that is directed into the air flow. The leading edge may be determined by a plurality of neighboring stagnation points at least one operational state. The front skin is mainly designed according to the aerodynamic requirements and may comprise two spanwise edges arranged at a distance to the leading edge to delimit the structural extension of the front skin. The front skin extends between these edges preferably in a curved shape, at least in an extended position.

The design principle of the flow body according to the invention includes a combination of the front skin and at least the trailing-edge component. Also, an internal stiffening structure may be provided. A gist of the invention lies in the creation of the trailing-edge component being a simplified component, which leads to clearly reduced manufacturing costs. At the same time, a simple installation is enabled. The trailing-edge component may be made in a separate manufacturing process and subsequently combined with the front skin. This allows the elimination of a more complex trailing-edge assembly and its replacement by a single part trailing edge. It may be a part made of aluminum in an extrusion process. However, other metallic and non-metallic materials are feasible. Also, material removing processes can be used, such as machining processes in the form of cutting or milling. The component allows for a clear decrease in the manufacturing costs compared to honeycomb structures. Also, the number of parts of the flow body can be decreased, and the component quality can more easily be checked. Still further, the trailing-edge component allows an increase of the size of the hollow space inside the flow body by providing a suitable cross-sectional profile shape, such as with a recess or an undercut, which, in turn, allows an increase of a de- or anti-iceable area.

Due to the constant profile, the trailing-edge component can be manufactured with a process that is capable of producing parts with a virtually unlimited extension. The required trailing-edge component may then be obtained by simply cutting the required size out of a part that is produced by such a process and installing it on the flow body. Due to the general shape of the trailing-edge component, it can be bent into shape to conform the shape of a trailing-edge region of the flow body. For example, it may be bent to follow a local dihedral of a trailing edge of the flow body that may change in a spanwise direction.

Bending the trailing-edge component may be conducted manually, directly during the installation. Since the trailing-edge component may be an elongated and rather flat and narrow part, it may follow a given shape without much effort. The design of the cross-sectional profile of the trailing-edge component may generally base on a trade-off between aerodynamic characteristics, simplicity of the manufacturing process as well as a desired flexibility. It is preferred that the trailing-edge component has a sufficient flexibility that allows a following of the shape of a flow body without having to use additional tools, in an allowed tolerance range. The variable design parameters to reach this behavior may include the specific shape, which may include the general profile dimensions, as well as the provision of holes, pockets, stiffeners, local recesses in a spanwise or chordwise direction or cutouts. A gist lies in manufacturing a simple and straight profile body as the trailing-edge component, which is flexible enough to follow the wing as well as required. By providing such a trailing-edge component, a rigging process of a slat or another flow body reduces the probability of constraining forces inside the flow body.

While it is generally preferred to not require an additional tool, it may also be possible to use a mold or a form, into which the trailing-edge component is placed after cutting it out of the produced part to bend it into shape by a manual interaction. This may be feasible, particularly for rather short trailing-edge components.

The trailing-edge component and the front skin, in combination, are designed to provide a flush transition. This is to be understood that a step, a recess, an indentation or a bump in a position where the front skin and the trailing-edge component are joined, is avoided. If the flow body is a slat or a similar part, it may be more important to provide a flush transition between a top edge of the front skin and the trailing-edge component than between a bottom edge of the front skin and the trailing-edge component.

It is to be understood that features relating to an anti- or de-icing process, which are explained in this disclosure, may be applied to anti-icing devices, de-icing devices and anti- and de-icing devices at the same time.

In an advantageous embodiment, the trailing-edge component comprises at least one recessed spanwise receiving surface for receiving a spanwise edge region of the front skin, wherein the at least one receiving surface is delimited by a step facing the trailing edge, and wherein the step is designed for providing the flush transition between the front skin and the trailing-edge component. The receiving surface is thus adapted to receive the respective edge region. The associated spanwise edge may abut the step of the receiving surface. By dimensioning the step to equal the thickness of the front skin and an optional sealing agent layer or a glue layer, the transition between the front skin and the trailing-edge component is flush. The recessed receiving surface may preferably be flat.

To join the trailing-edge component to the front skin, the front skin is preferably attached to the at least one receiving surface. This may be conducted by gluing, riveting, co-bonding, screwing or other joining methods. It is to be understood that if mechanical fasteners are used, they may preferably be countersunk.

Still further, the cross-sectional profile of the trailing-edge component may comprise at least one leg that extends away from the trailing edge for receiving the front skin. Hence, the at least one leg may comprise at least one recessed receiving surface to attach the front skin to.

The flow body may enclose a hollow space, wherein the trailing-edge component comprises two legs, which provide an open intermediate space, and wherein the hollow space extends into the intermediate space. Consequently, the cross-sectional profile of the trailing-edge component may have a wedge shape with a cutout opposite to the trailing edge. The cutout may also comprise a wedge shape to form interior edges. The interior edges of the profile may be parallel to the respective outer edges of the profile. However, other shapes are possible. The hollow space of the flow body thus extends further in the direction to the trailing edge of the trailing-edge component into the intermediate space between the legs. As mentioned above, this increases the de- or anti-iceable area.

In an advantageous embodiment, the flow body comprises a hollow space, in which at least one spar extends along a spanwise direction, wherein a rear air chamber is created rearward of the at least one spar, which rear air chamber extends from the at least one spar to a junction of the legs. The rear air chamber may be a part of an anti-ice system that depends on hot air supplied into the hollow space of the flow body. For example, air at an elevated temperature may be supplied into the rear air chamber to flow along an interior side of the front skin and the trailing-edge component, to flow out of the rear air chamber through suitable outflow openings.

However, also a single leg may extend away from the trailing edge, wherein the single leg provides at least one receiving surface to receive at least one spanwise edge region of the front skin. Preferably, the single leg may be arranged in the middle between a top and a bottom side of the trailing-edge component and provides two receiving surfaces on the opposed sides of the leg.

Also, a forward air chamber may be created forward of the at least one spar, wherein the rear air chamber and the forward air chamber are in fluid communication. Air at an elevated temperature may be supplied to the forward air chamber to flow along an interior side of the front skin to heat up the relevant surface areas of the front skin. The air may then flow through channels or openings into the rear air chamber. A separation of the hollow space of the flow body allows to control the air flow for anti-icing or de-icing.

The flow body may further comprise a back skin arranged at a distance to the front skin, wherein a spanwise edge of the back skin is arranged on the trailing-edge component. It may be feasible, but not absolutely necessary, to also provide a flush transition between the back skin and one of the two spanwise flow surfaces. The trailing-edge component is thus attached to the front skin and the back skin.

It may be feasible if the back skin is attached to the at least one spar, wherein the rear air chamber is additionally delimited by the back skin. The rear air chamber thus is defined by the front skin, the spar, the back skin and the trailing-edge component.

Of course, other design variants of the flow body are possible, in which, for example, two spanwise edges of the front skin are attached to two recessed receiving surfaces of the trailing-edge component. Also, a spar is not considered a necessary part, as other components may be provided for achieving a desired mechanical stability.

In an advantageous embodiment, the flow body is a leading-edge slat, wherein the trailing-edge component provides a trailing edge of the slat. The slat may be coupled with an actuation mechanism to provide a translational and rotational motion relative to a fixed wing.

As stated above, the spanwise edge may also be a vertical edge, if a vertical tail plane or similar component is considered. Consequently, the above identified features also apply for a flow body that is arranged to extend along a vertical axis.

Preferably, the trailing-edge component is an extruded part. It is produced by pressing a material through a matrix, which defines the cross-sectional profile of the part to be produced. By an extrusion process, the manufacturing process is simplified and a part with a virtually unlimited longitudinal extension may be produced, which is then cut into trailing-edge components with the desired length. It is to be understood that additional surface processing may be applied to reach a desired surface quality or dimensions with high precision. The extrusion process also allows the production of a hole inside the component for reducing the weight and for improving the deformability to simplify the adaption to the shape of the flow body. Consequently, the trailing-edge component may comprise at least one hole inside the cross-sectional profile.

The general shape of the trailing-edge component may be adapted to improve the deformability to adapt its shape to the shape of the flow body. For example, this may include a chamfered trailing-edge, a certain tapering course, a step or an inward bulge at a bottom surface of the trailing-edge component or other features. Also, these features may be integrated to further improve the aerodynamic characteristics. The cross-sectional profile may generally be selected based on a trade-off between aerodynamic characteristics and simplicity of the manufacturing process. Additional material-removal processes may be used for including additional recesses, cutouts, holes, grooves or similar features to further control the flexibility to support the adaptability of the shape of the trailing-edge component to the flow body.

The invention further relates to a wing having a fixed wing body and a wing leading edge device having a flow body according to the above description. The wing leading-edge device may be a part of a high lift system installed on the wing.

The wing may further comprise an anti- or de-icing device providing air at an elevated temperature, which is in fluid communication with a hollow space of the flow body. The trailing-edge component may be designed to provide a part of the hollow space.

The invention further relates to an aircraft, having wings according to the above description or at least one flow body according to the above description. As mentioned above, the flow body may be a movable or a fixed component.

Still further, the flow body may be a part of a wing leading edge device arranged on a fixed wing body of a wing.

The aircraft may be a commercial aircraft. The wings may be swept wings. Additionally, the wings may comprise a local V angle that changes at least in a section of the wing in a spanwise direction. The trailing-edge component may be arranged on a flow body that constitutes a part of the wing, such as a fixed wing. It may also be arranged on a flow body that belongs to a part attached to or coupled with the wing. The trailing-edge component according to the above description can follow the required dimensional course by bending it into shape.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

FIG. 1 shows a first exemplary embodiment of a flow body.

FIG. 1A shows an enlarged portion A from FIG. 1.

FIG. 2 shows a second exemplary embodiment of a flow body.

DETAILED DESCRIPTION OF THE PREFERRED EMBODIMENTS

Figure 3:
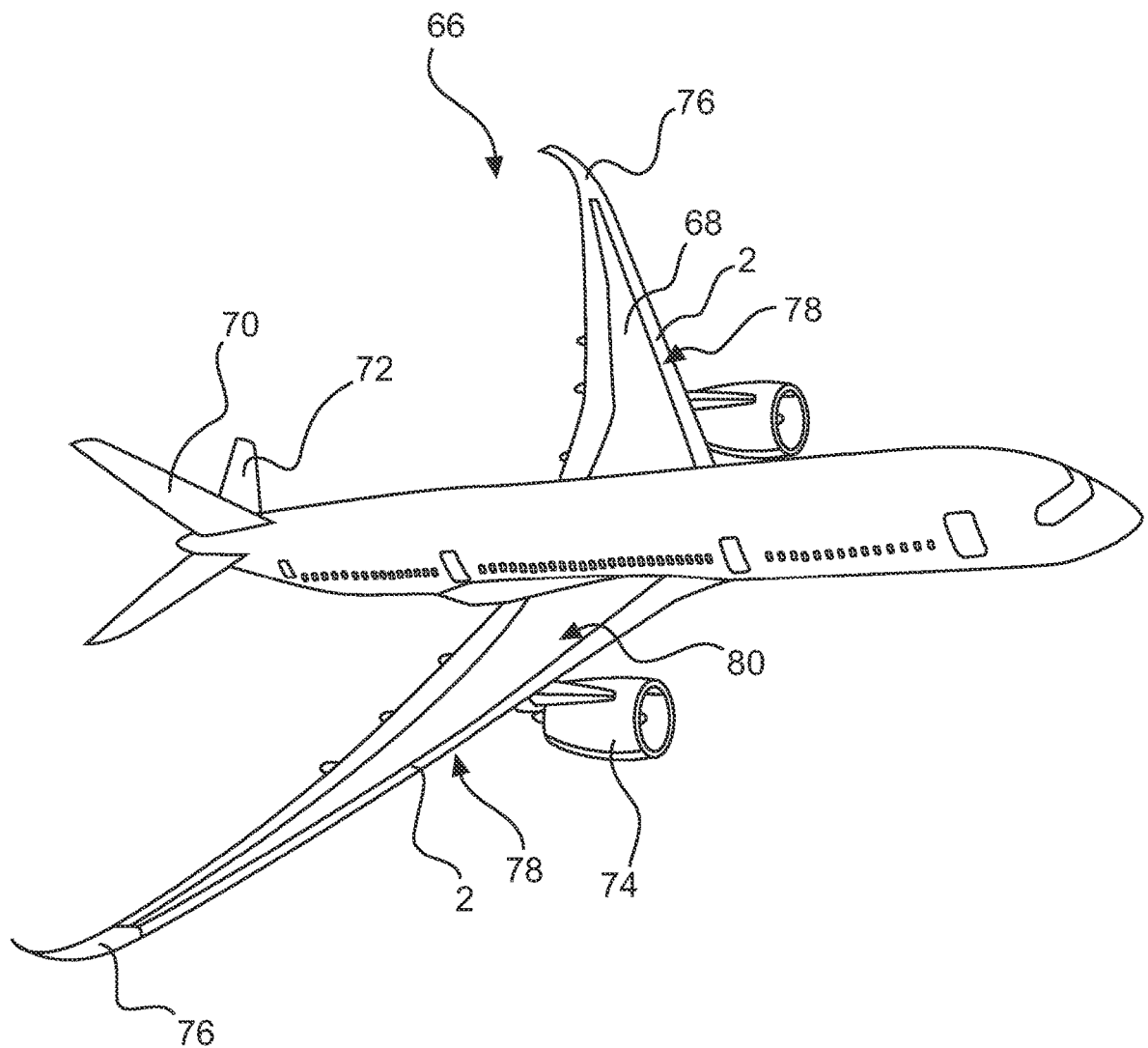
FIG. 3 shows an aircraft having at least one flow body.

FIG. 1 shows a sectional view of a flow body 2 for an aircraft, which is exemplarily realized in the form of a leading-edge slat. The flow body 2 comprises a curved front skin 4 having a leading edge 6 in at least one flow condition. The front skin 4 is curved to form an aerodynamic surface with a predetermined flow characteristic. Opposite to the leading edge 6, a trailing edge 8 is positioned. Exemplarily, a spar 10 extends between a top section 12 and a bottom section 14 of the flow body 2, on which the front skin 4 rests. At a side facing away from the leading edge 6, a back skin 16 is arranged, which is attached to a rear side of the spar 10 and extends towards the trailing edge 8.

The flow body 2 comprises a trailing-edge component 18, which comprises the trailing edge 8. It is an extruded or machined and solid component. For example, the trailing-edge component 18 is made from aluminum in an extrusion process.

The front skin 4 comprises a first spanwise edge 20, which constitutes an upper rear delimitation of the front skin 4. For receiving a first edge region 22, which comprises the first spanwise edge 20, the trailing-edge component 18 comprises a first recessed receiving surface 24. The trailing-edge component 18 further comprises a second recessed receiving surface 26 for receiving a second edge region 28 of the back skin 16, which comprises a second spanwise edge 30. This is shown in enlarged view FIG. 1A in further detail.

The trailing-edge component 18 tapers in a chordwise direction to form two spanwise flow surfaces 32 and 34. The first spanwise flow surface 32 extends the shape of the front skin 4 towards the trailing edge 8. The second flow surface 34 extends the shape of the back skin 16 towards the trailing edge 8. The receiving surfaces 24 and 26 are each delimited by a step 36 and 38, respectively. The front skin 4 abuts the step 36 of the first receiving surface 24, while the back skin 16 abuts the step 38 of the second receiving surface 26. Hence, a flush transition between the front skin 4 and the first flow surface 32 and between the back skin 16 and the second flow surface 34 is made. It is to be understood, that the dimensions of the steps 36 and 38 is adapted to conform the thickness of the front skin 4 and the back skin 16, respectively, including all optional material layers between the trailing-edge component 18 and the front skin 4 and the back skin 16, respectively.

The trailing edge component 18 comprises a wedge shape, while the cross-sectional profile comprises two legs 40 and 42, at which the receiving surfaces 24 and 26 are arranged. Both legs 40 and 42 enclose an intermediate space 44, i.e., a hollow space.

The flow body 2 of FIG. 1 exemplarily comprises a forward air chamber 46 enclosed by the front skin 4 and the spar 10. In a rear direction, a rear air chamber 48 is situated, which is in a fluid communication with the forward air chamber 46. For this, exemplarily openings 50 are provided in the spar 10. The rear air chamber 48 is defined by the spar 50, the front skin 4, the back skin 16 and the intermediate space 44.

The forward air chamber 46 and the rear air chamber 48 are used for an anti- or de-icing device, which may provide air at an elevated temperature into the forward air chamber 46. Thus, supplied air flows on an interior side of the front skin 4 and reaches the rear air chamber 48 by passing the openings 50. By providing the intermediate space 44, an active anti- or de-icing surface area of the front skin 4, which is marked with reference numeral 52, clearly extends into a rearward direction. Hence, anti- or de-icing is clearly improved in comparison with common design principles of leading-edge devices.

Furthermore, the trailing edge component 18 can be manufactured at clearly reduced costs compared to a honeycomb material construction. Altogether, flow body 2 according to the exemplary embodiment of FIG. 1 is clearly improved in terms of anti- or de-icing effect and manufacturing costs.

For the sake of completeness, a section 54 on the flow body 2 may be designated for attaching a lever for coupling the flow body 2 with an actuator or the like is exemplarily depicted. However, this is merely an example.

FIG. 2 shows another example of a flow body 56, which only comprises a front skin 58 having a curved shape. The trailing-edge component 18 is made in an extrusion process, by which a hole 59 is integrated into the cross-sectional profile. This allows a reduction of the weight and an improvement of the deformability to adapt the trailing-edge component 18 to the shape of the flow body 56. Of course, the trailing-edge component 18 may be made without the hole 59. Also, the trailing-edge component 18 of FIG. 1 may comprise the hole 59.

It is to be understood that also other shapes of the hole 59 are possible. Also, multiple holes 59, even with different shapes, are possible. To close the respective hole 59 at a most inboard or outboard end of the trailing-edge component 18, additional parts may be used. These may include clips or seals, an end rib of the flow body 56 or only a sealant, if possible.

In the example of FIG. 2, a first spanwise edge 60 and a second spanwise edge 62 abut the steps 36 and 38 of the trailing-edge component 18. Inside the flow body 56, a hollow space 64 is created, which may comprise stiffening elements, air chambers or any other features that are required.

FIG. 3 shows an aircraft 66, which comprises wings 68, a vertical tail plane 70, horizontal tail planes 72, engines 74 and winglets 76. These components may also comprise flow bodies that are designed according to the above description. For example, the wings 68 comprise leading-edge devices 78 having flow bodies 2 according to FIG. 1. Still further, an anti- or de-icing device 80 is provided, which is merely indicated with reference numeral 80. It may exemplarily be coupled with a bleed air port from at least one of the engines 74 for supplying air at an elevated temperature to the air chambers 46 and 48.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 flow body
4 front skin
6 leading edge
8 trailing edge
10 spar
12 top section
14 bottom section
16 back skin
18 trailing-edge component
20 first spanwise edge
22 edge region
24 first receiving surface
26 second receiving surface
28 edge region
30 second spanwise edge
32 first spanwise flow surface
34 second spanwise flow surface
36 step
38 step
40 leg
42 leg
44 intermediate space
46 forward air chamber
48 rear air chamber
50 opening
52 anti- or de-icing surface area
54 section for attaching a lever
56 flow body
58 front skin
59 hole
60 first spanwise edge
62 second spanwise edge
64 hollow space
66 aircraft
68 wing
70 vertical tail plane
72 horizontal tail plane
74 engine
76 winglet
78 leading-edge device
80 anti- or de-icing device

The invention claimed is:

1. A flow body for a wing leading edge device of an aircraft, the flow body comprising:
a curved front skin having a leading edge, and
at least one trailing-edge component coupled with at least one spanwise edge region of the front skin,
wherein the trailing-edge component comprises a single-piece construction having a continuous perimeter cross-sectional profile that tapers in a chordwise direction to form two spanwise flow surfaces that end in a trailing edge, wherein the cross-sectional profile is taken transverse to a longitudinal extension of the trailing-edge component,
wherein the flow body has a rear air chamber, wherein the trailing-edge component comprises two spaced apart legs forming an intermediate space therebetween, the two spaced apart legs extending into the rear air chamber such that the trailing-edge component encloses the rear air chamber, wherein the rear air chamber is delimited by the trailing-edge component, and wherein the trailing-edge component is configured to provide a flush transition between the front skin and at least one of the two spanwise flow surfaces.

2. A flow body for a wing leading edge device of an aircraft, the flow body comprising:

a curved front skin having a leading edge, and at least one trailing-edge component coupled with at least one spanwise edge region of the front skin, wherein the trailing-edge component comprises a single-piece construction having a continuous perimeter cross-sectional profile that tapers in a chordwise direction to form two spanwise flow surfaces that end in a trailing edge, wherein the cross-sectional profile is taken transverse to a longitudinal extension of the trailing-edge component, wherein the flow body has a rear air chamber, wherein the trailing-edge component comprises two spaced apart legs forming an intermediate space therebetween, the two spaced apart legs extending into the rear air chamber such that the trailing-edge component encloses the rear air chamber, wherein the rear air chamber is delimited by the trailing-edge component, and wherein the trailing-edge component is configured to provide a flush transition between the front skin and at least one of the two spanwise flow surfaces, wherein the trailing-edge component comprises at least one recessed spanwise receiving surface for receiving a spanwise edge of the at least one spanwise edge region of the front skin, wherein the at least one recessed spanwise receiving surface is delimited by a step facing the trailing edge, and wherein the step is configured to provide the flush transition between the front skin and the trailing-edge component.

3. The flow body according to claim 2, wherein the front skin is attached to the at least one recessed spanwise receiving surface.

4. The flow body according to claim 1, wherein the flow body comprises the hollow space, in which at least one spar extends along a spanwise direction, wherein a rear air chamber is created rearward of the at least one spar, in which the rear air chamber extends from the at least one spar to a junction of the two legs.

5. The flow body according to claim 4, wherein a forward air chamber is created forward of the at least one spar, and wherein the rear air chamber and the forward air chamber are in a fluid communication.

6. The flow body according to claim 1, further comprising a back skin arranged at a distance to the front skin, wherein a spanwise edge of the back skin is arranged on the trailing-edge component.

7. The flow body according to claim 4, further comprising a back skin arranged at a distance to the front skin, wherein a spanwise edge of the back skin is arranged on the trailing-edge component, wherein the back skin is attached to the at least one spar, and wherein the rear air chamber is additionally delimited by the back skin.

8. The flow body according to claim 1, wherein the flow body is a leading-edge slat and wherein the trailing-edge component provides a trailing edge of the slat.

9. The flow body according to claim 1, wherein the trailing-edge component is an extruded part.

10. A wing having a fixed wing body and a wing leading edge device having a flow body according to claim 1.

11. The wing according to claim 10, further comprising an anti- or de-icing device providing air at an elevated temperature, which is in fluid communication with a hollow space of the flow body.

12. An aircraft having wings according to claim 10.

13. An aircraft having at least one flow body according to claim 1.

14. The aircraft of claim 13, wherein the flow body is a part of a wing leading edge device arranged on a fixed wing body of a wing.

* * * * *